United States Patent
Shah et al.

(10) Patent No.: US 8,201,021 B1
(45) Date of Patent: Jun. 12, 2012

(54) METHOD AND APPARATUS FOR EFFICIENTLY CREATING BACKUP FILES WITH LESS REDUNDANCY

(75) Inventors: Sunil Shah, Fremont, CA (US); Kirk L. Searls, Maitland, FL (US); Ynn-Pyng "Anker" Tsaur, Oviedo, FL (US)

(73) Assignee: Symantec Corporation, Mountain View, CA (US)

( * ) Notice: Subject to any disclaimer, the term of this patent is extended or adjusted under 35 U.S.C. 154(b) by 2104 days.

(21) Appl. No.: 11/048,458

(22) Filed: Jan. 31, 2005

(51) Int. Cl.
*G06F 11/00* (2006.01)
(52) U.S. Cl. ........... 714/15; 714/819; 714/822; 714/765
(58) Field of Classification Search .......... None
See application file for complete search history.

(56) References Cited

U.S. PATENT DOCUMENTS

| | | | |
|---|---|---|---|
| 5,933,842 A * | 8/1999 | Ross | 715/514 |
| 6,226,759 B1 * | 5/2001 | Miller et al. | 714/6 |
| 6,675,177 B1 | 1/2004 | Webb | |
| 6,704,730 B2 * | 3/2004 | Moulton et al. | 707/6 |
| 6,785,786 B1 * | 8/2004 | Gold et al. | 711/162 |
| 6,889,297 B2 * | 5/2005 | Krapp et al. | 711/159 |
| 2005/0071392 A1 | 3/2005 | Sandorfi et al. | |
| 2006/0064444 A1 | 3/2006 | van Ingen et al. | |

OTHER PUBLICATIONS

Sepaton Sales Literature, copyright 2004, 4 pages.

\* cited by examiner

*Primary Examiner* — Christopher McCarthy
(74) *Attorney, Agent, or Firm* — Campbell Stephenson LLP

(57) ABSTRACT

A method of creating backup files having less redundancy. The method creates a backup file by creating an overhead segment for each file that is to be backed up and creating a data segment containing the data that is to be backed up for each file. After creating the overhead segment and the data segment, the overhead segment is placed into an overhead stream data segment is stored in memory. The overhead segment is also positioned in the overhead stream with a pointer that identifies the data segment within the memory. For backups of subsequent servers or the same server at a later time, the backup software will create a separate overhead stream. However, a plurality of overhead streams may contain pointers to the same data segments such that redundant data segments do not need to be stored in a backup server.

17 Claims, 4 Drawing Sheets

400

METHOD AND APPARATUS FOR EFFICIENTLY CREATING BACKUP FILES WITH LESS REDUNDANCY

This application contains subject matter that is related to the subject matter of co-pending U.S. patent application Ser. No. 11/047,139, filed Jan. 31, 2005. The aforementioned related patent application is herein incorporated by reference.

BACKGROUND OF THE INVENTION

1. Field of the Invention

The present invention is generally related to backup storage systems and, more particularly, to a method and apparatus for generating backup files with less redundancy.

2. Description of the Related Art

To provide data redundancy and security within a computer network, information stored in a server connected to the network is backed up to a storage system on a periodic basis. Generally, a plurality of servers are connected to a backup server. The backup server serves as a primary component in a storage management system whereby timing and control of the backup processes are performed by the backup server. Periodically, information stored in the servers is copied to the backup server. The backup server generally stores the information within a mass storage system or device.

Servers contained within an enterprise system generally contain redundant software that runs or is executed on each server. Identical software stored on each of the servers, along with associated data files that support the software, are periodically backed up to a backup server. When such backups occur, the identical copies of software and data are stored separately within the memory of the backup server or mass storage system. Such use of storage space to repeatedly store identical software on the backup server is an inefficient use of the memory of the backup server. Since, within an enterprise system, there are many servers that have identical software, a substantial percentage of the memory utilized within the backup server is used to store identical copies of software and data. Such use of memory may require additional storage to be added at a substantial cost.

Therefore, there is a need in the art for an improved process for backing up information with less redundancy.

SUMMARY OF THE INVENTION

The present invention is a method of creating backup files having less redundancy when stored in a random access device. The method creates a backup file by creating an overhead segment for each file that is to be backed up and creating a data segment containing the data that is to be backed up for each file. After creating the overhead segment and the data segment, the overhead segment is placed into an overhead stream and the data segment is stored in memory. The overhead segment is also positioned in the overhead stream with a pointer that identifies the data segment within the memory. The overhead stream is generally identified by the .bkf file extension. The data segments can be accessed by accessing the .bkf file and utilizing the pointers to identify the appropriate data segments within the memory.

For backups of subsequent servers or the same server at a later time, the backup software creates a separate overhead stream as each individual server is backed up. At the time of backup, the invention determines whether a particular data segment already exists in the backup storage. If the data segment is redundant, it is deleted and the corresponding overhead stream is updated to identify the previously stored identical data segment.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Figure 1:
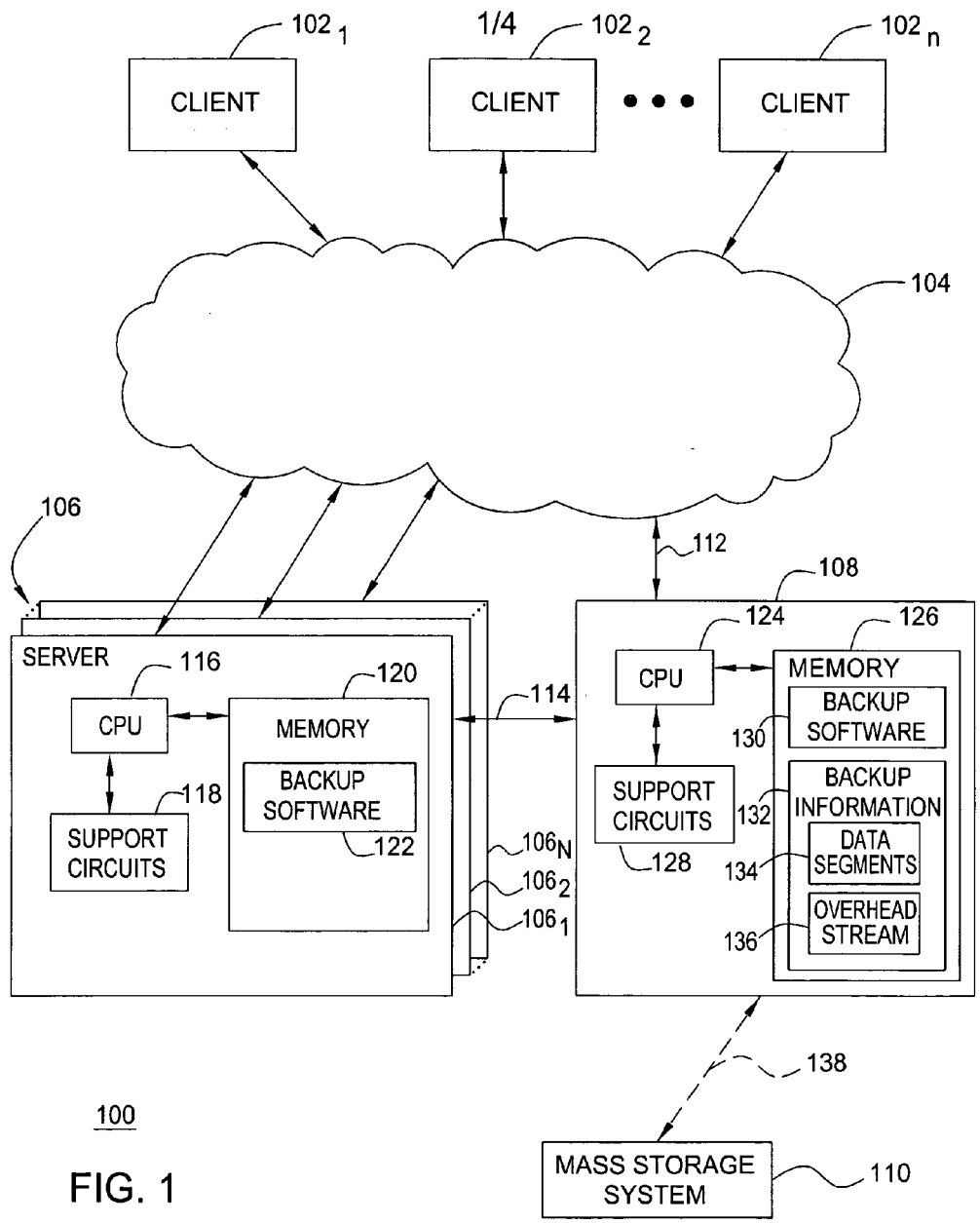
FIG. 1 depicts a block diagram of computer network that functions in accordance with the present invention.

FIG. 1 is a block diagram of computer network 100 in which one embodiment of the present invention may be utilized. The computer network comprises a plurality of computers $102_1, 102_2, \ldots 102_N$ connected to a plurality of servers $106_1, 106_2, \ldots 106_N$ (collectively referred to as servers 106) via a network 104. The servers 106 are connected to at least one backup server 108. The connection to the backup server 108 may be through a private network 114 or connected through the public network 104 via connection 112. In some situations, both connections may be used.

In one embodiment of the invention, the backup server 108 is coupled to a mass storage system 110 via path 136. Although one backup server 108 and one mass storage system 110 is depicted, those skilled in the art will understand that there may be a plurality of either backup servers or mass storage systems to provide the redundancy for the network. Also, the mass storage system 110 may be part of the backup server, may be external to the backup server, may be remotely located from the backup server, or may be shared by multiple backup servers.

Each server 106 comprises a central processing unit (CPU) 116, support circuits 118 and memory 120. The CPU 116 may be one or more of any readily available microprocessors or microcontrollers. The support circuits 118 are well known circuits that are used to facilitate operation of the CPU and comprise one or more circuits, such as clock circuits, cache, power supplies, input/output circuits, and the like. The memory 120 may be any form of memory for storing software or digital information comprising one or more of random access memory, read-only memory, disk drives, optical memory, removable storage, flash memory, and the like. Specific to this invention, the server 106 stores in memory 120 backup software 122 that facilitates a backup of information stored in the memory 120 of at least one server 106 to backup server 108.

The backup server 108 comprises a central processing unit (CPU) 124 support circuits 128 and memory 126. As with the servers 106, the CPU 124 may be one or more of any readily available microcontrollers or microprocessors. The support circuits 128 comprise well known circuits for support of the operation of the CPU 124. The circuits include one or more clock circuits, cache, input/output circuits, power supplies, and the like. The memory 126 may be any form of digital memory including one or more random access memory, read-only memory, disk drives, optical storage, removable storage, flash memory, and the like. The backup server memory 126 generally stores a variety of software including backup software 130 and the backup data 132 from at least one server 106. The backup data 132 contains at least one data segments 134 and an overhead stream 136. The backup information 132 may be stored within the backup server either temporarily or more permanently depending upon the type of backup server involved, i.e., whether the backup server operates in write-through or write-back mode. The backup information 132 may be stored in a mass storage system 110 for archival purposes. The mass storage system 110 may be any form of bulk storage including optical storage, RAID storage, and the like. To facilitate operation of the invention, the backup information, whether stored in the backup server or in the mass storage system, is stored in random access memory.

In operation, server 106 will support the functionality of the client computers 102 to provide data and software for utilization by the client computers 102 through the network 104. Occasionally, the backup software 122 will be triggered to backup some or all of the data and other information within memory 120 of the server 106. The backup software 130 within the backup server 108 periodically communicates with the backup software 122 within the various servers 106. The data and other information within memory 120 of the server 106 is moved to the memory 126 within the backup server 108. This backup information may be held temporarily in cache before being moved to the mass storage system 110 (i.e., write-back mode), or the backup information 132 may pass directly through the backup server to the mass storage system 110 (i.e., write-through mode).

Figure 2:
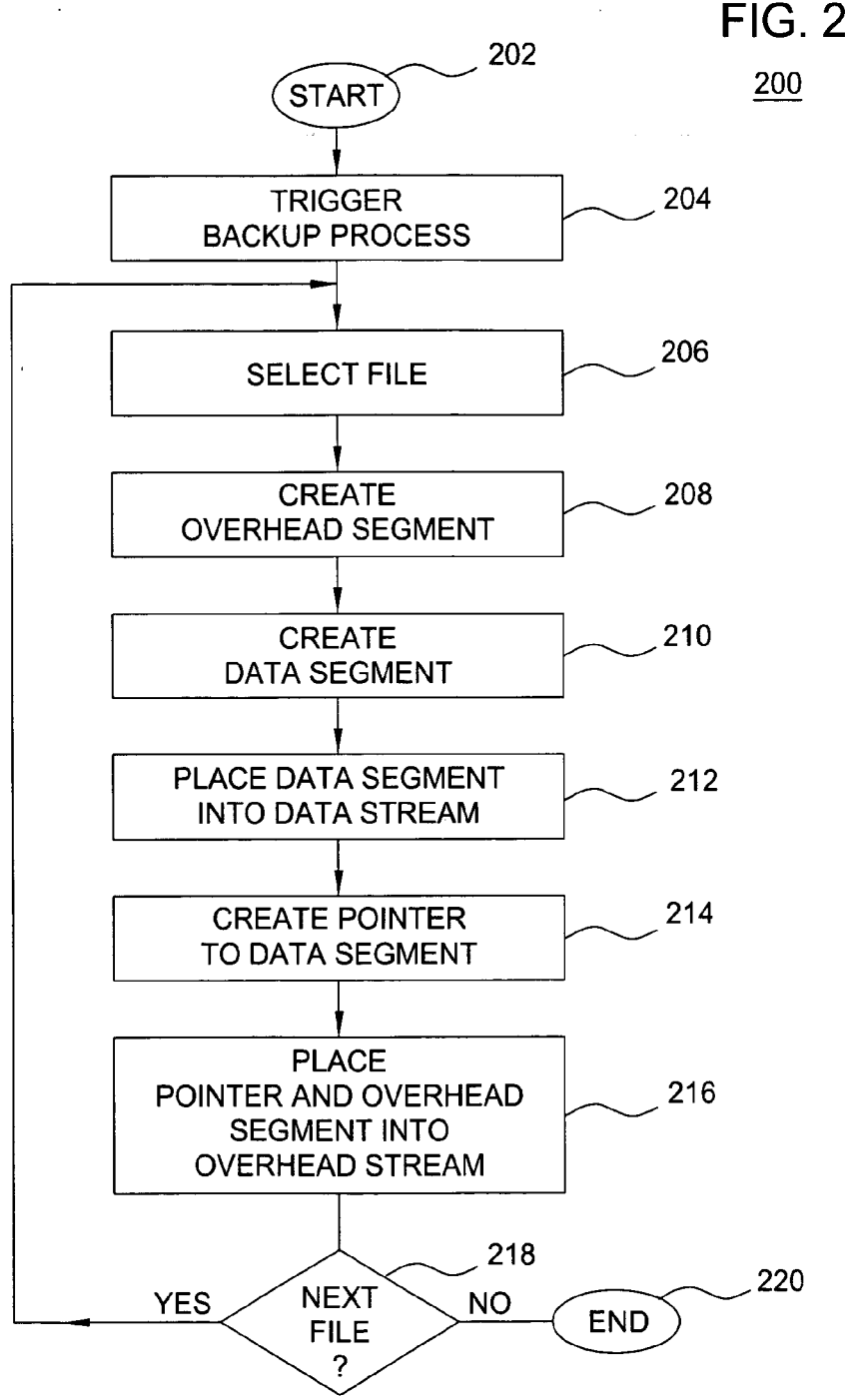
FIG. 2 depicts a flow diagram of a process for generating a backup file in accordance with the present invention.

FIG. 2 depicts a method 200 of creating the backup information 132 containing a data stream 134 and an overhead stream 136. The method 200 begins at step 202 and proceeds to step 204, where the backup process is triggered. At step 206, a file (e.g., software file, data file and the like) is selected for backup. At step 208, an overhead segment is created for the selected file. The overhead segment may contain security information as well as error correction information and the like.

At step 210, the data segment is created that contains the data from the selected file. At step 212, the data segment is stored in memory. Alternatively the data segments can be placed into a data stream. The data stream comprises a concatenated set of data segments from each selected file.

At step 214, a pointer is created that will identify where the data segment is stored within the memory (or where the data segment is located within the data stream). At step 216, the pointer and the overhead segment are placed into an overhead stream. At step 218, the method 200 queries whether a next file should be processed. If the query at step 218 is affirmatively answered, the method 200 continues to step 206 where the next file is processed to create the next data segment. If another file is to be processed, the query at step 218 is negatively answered and the method 200 ends at step 220. In this manner, each data file to be backed up is formed into a data segment and an overhead stream. The overhead stream contains the overhead information and a pointer to the data segments that are associated with each of the overhead segments. The overhead stream is given a ".bkf" extension.

Figure 3:
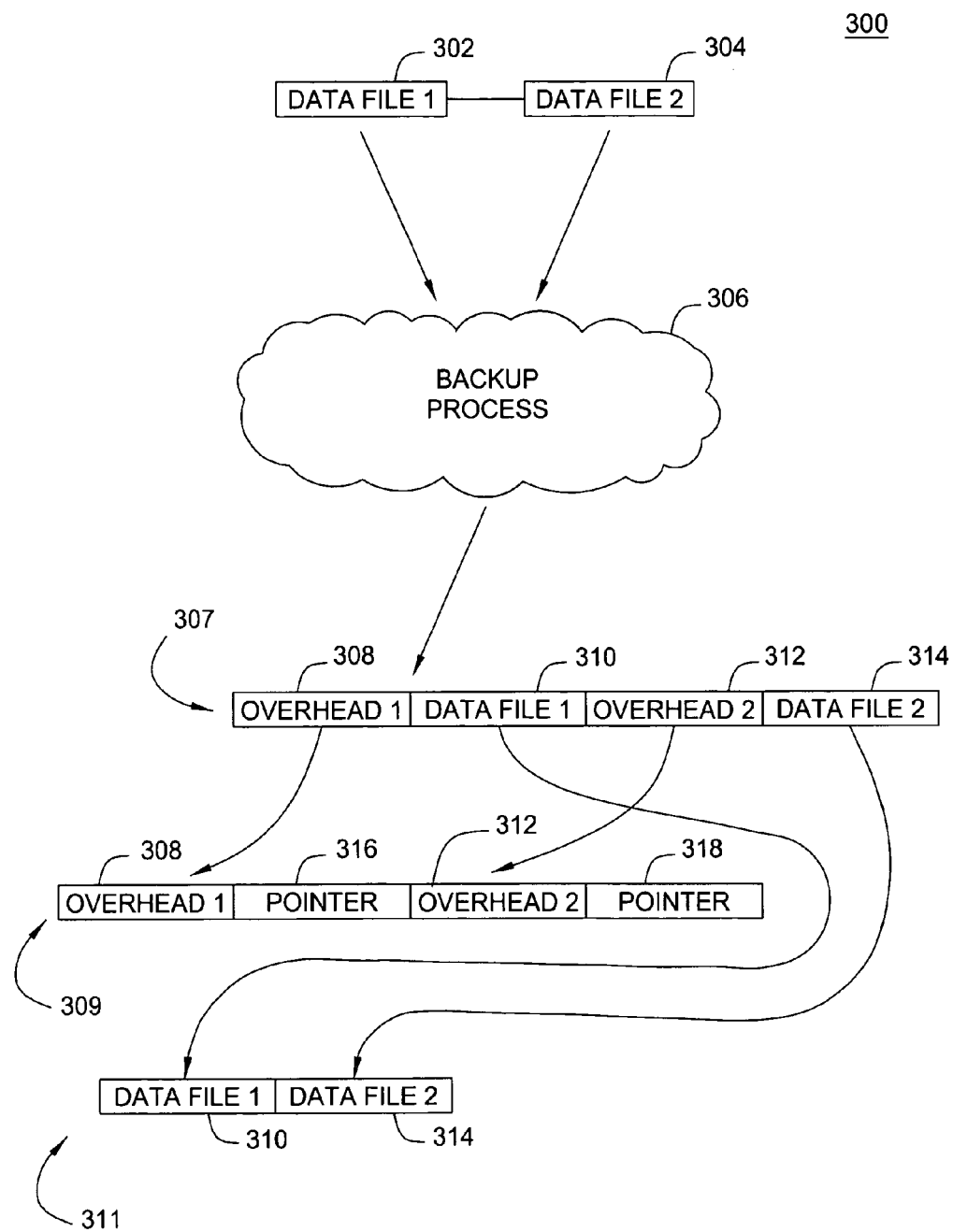
FIG. 3 depicts a schematic view of a process for creating a backup file in accordance with the present invention.

FIG. 3 depicts a schematic view of the process 300 described in FIG. 2. Data file 302 and data file 304 are to be backed up by backup process 306. The data files are attached to overhead information that generally would be placed before each data file in a single stream that complies with the MTF protocol. Although MTF is described herein, this protocol is considered to be one example of a media format that is supported by the present invention. Other medium formats can be used in conjunction with the present invention. Stream 307 depicts a typical prior art, MTF backup file stream comprising overhead segments interleaved with data file segments to form the stream. In the prior art, this stream forms a conventional .bkf file. In the present invention, the overhead segments are placed into a separate stream 309, i.e., the overhead stream containing the overhead segments 308 and 312 as well as pointers 316 and 318. The data files 310 and 314 are placed into a separate stream 311 that forms the data stream 311. Alternatively, the data files can be stored at memory addresses without being concatenated into a "stream". The overhead stream pointers 316 and 318 identify where in the data stream 311 (or in memory) the data segments 310 and 314 are located. The overhead stream 309 is accorded the .bkf file extension.

The use of a separate overhead stream and separate data segments enables a number of special services to be provided within a backup system. One such service enables the backup system to reduce the redundancy of files that are stored within the backup memory.

Figure 4:
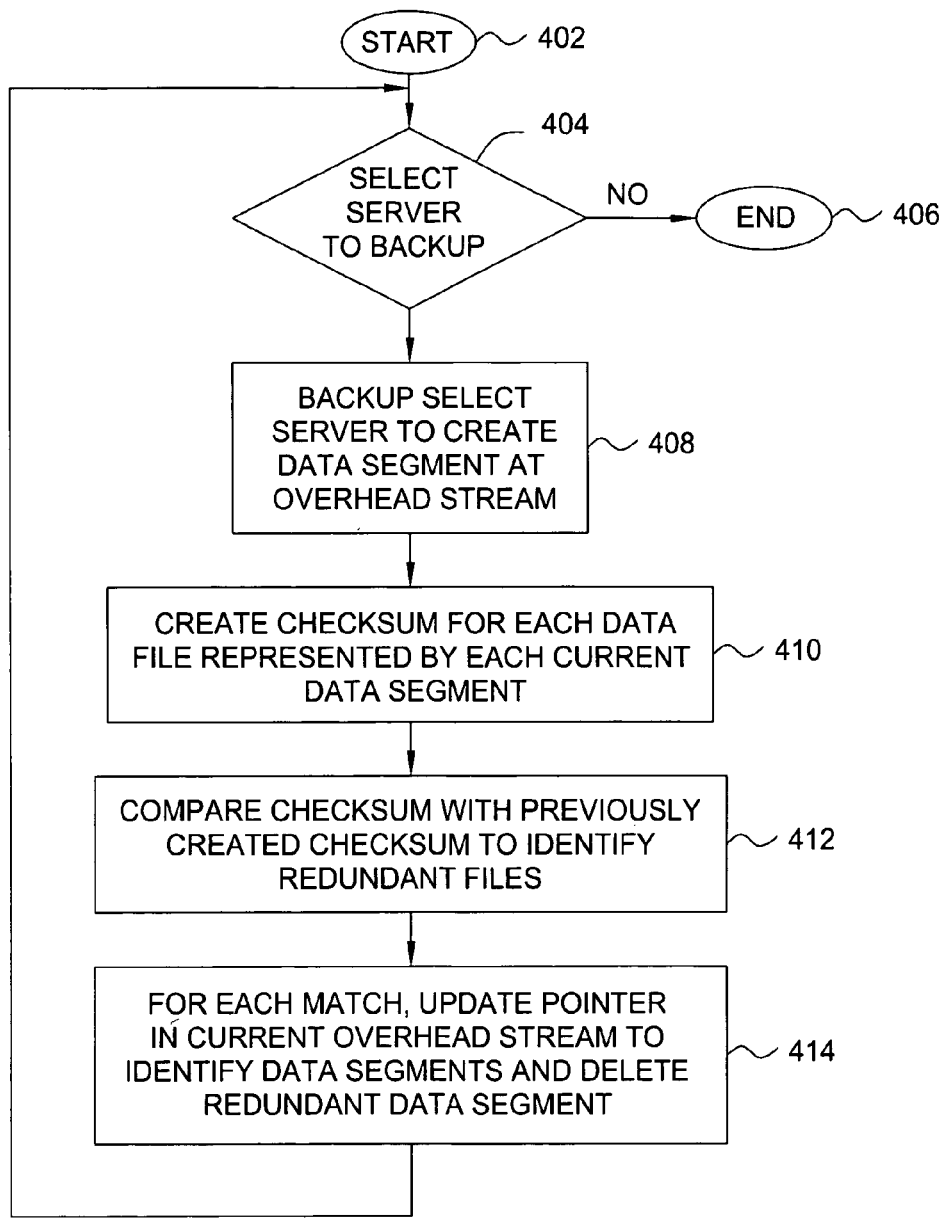
FIG. 4 depicts a flow diagram of a backup process that creates a backup file having less redundancy.

FIG. 4 depicts a method 400 of reducing the file redundancy amongst sets of backup files. The method 400 begins at step 402 and proceeds to step 404. At step 404, the method 400 selects which server is to be backed up. If no server is to be backed up, the process ends at step 406. If a server is selected, for example, server 106$_1$, the method proceeds to step 408 where the server is backed up in accordance with the method of FIG. 2. This backup process creates a backup set comprising data segments and a current overhead stream for the selected server. Each segment is an individual file that is copied from the server and stored in the backup server (or mass storage).

Since the overhead stream points to a data segment, the stream does not require the data segment to be solely related to that single overhead stream. Consequently, multiple overhead streams (e.g., one for each server backup) may point to the same data segment. Thus, redundant data segments within backup memory can be deleted, resulting in substantial memory space savings.

At steps 410, 412 and 414, the method 400 processes each data segment to determine if the segment is redundant. Redundant segments can be deleted and the corresponding overhead stream updated to point to the previously stored identical file. In one embodiment of the invention, a checksum is used to identify the redundant segments. Other techniques for identifying redundant files and segments are within the scope of this invention.

At step 410, the method 400 creates a checksum, e.g., an MD5 checksum, for each data segment. The checksum can be stored within the file system to form a directory for the data segment. More specifically, the checksum is parsed into sections such that the sections define the directory path for the specific file (data segment). For example, a 128-bit MD5 checksum can be divided into M sections having N-bit length, where M and N are integers greater than zero. Each N-bit section defines a level within a directory and the last N-bit section is used as the file name for the data segment. This results in files being evenly distributed in the file system.

At step 412, the checksum for each segment is compared to the checksums that have been created for previously stored segments. This comparison is performed through a lookup within the file system. For example, the comparison simply accesses the directory corresponding to the newly created checksum and scans the directory contents for a path and file name that matches the checksum. Any match between the checksum and the directory identifies a redundant data segment.

At step 414, for each matched checksum, the pointer is updated in the current overhead stream to identify the previously stored data segment and the redundant data segment is deleted. In this manner, only one copy of the data segment is stored within the backup server. Each data segment may be shared amongst a plurality of overhead streams. Once the comparison process is complete, the method 400 proceeds to step 404 where a decision is made to select another server to be backed up.

Although an MD5 checksum is a very reliable tool for determining whether files are identical, it is not foolproof. To ensure that the data segment to be deleted is truly redundant, in step 414, a "binary compare" can be performed between the allegedly matched data segment and the new data segment. If the binary compare process identifies the new data segment as being a match, then the new data segment can be deleted.

Alternatively, to ensure redundancy without using a MD5 checksum and a binary compare process, a "conflication resistant" hashing algorithm may be used to generate a unique signature or fingerprint for each data segment. This signature or fingerprint can be used in the invention as described above in lieu of a checksum.

In this manner, storage space can be substantially reduced because the data files, including software and other information, that is backed up from a server to a backup server is removed from the backup server if the backed up files are redundant with respect to a backup of another server or from a previous backup of the same server. Consequently, within a backup server, only a single copy of any file should exist regardless of the number of servers that are serviced by the backup server.

While the foregoing is directed to embodiments of the present invention, other and further embodiments of the invention may be devised without departing from the basic scope thereof, and the scope thereof is determined by the claims that follow.

The invention claimed is:

1. A method of creating backup files having less redundancy, comprising:
    triggering a backup process;
    for each file to be backed up, creating a data segment;
    storing the data segment at a location in memory;
    creating an overhead stream having a pointer that identifies the location of the data segment;
    determining if the data segment is redundant to a previously stored data segment;
    if the data segment is redundant, deleting the redundant data segment; and
    updating the overhead stream pointer to identify the previously stored data segment that is identical to the deleted data segment.

2. The method of claim 1 wherein the determining step comprises:
    computing a checksum that represents the contents of the data segment;
    comparing the checksum to at least one previously generated checksums; and
    if a matching checksum is found, identifying the data segment as redundant.

3. The method of claim 2 wherein the checksum is an MD5 checksum.

4. The method of claim 2 wherein the checksum is used to define a directory path and file name for the data segment.

5. The method of claim 2 further comprising, for each redundant data segment, performing a binary compare between the data segment and the previously stored data segment.

6. The method of claim 2 wherein the checksum is a unique signature or fingerprint representing the contents of the data segment.

7. The method of claim 1 wherein, each execution of the triggering step, creates a separate overhead stream, where a plurality of overhead streams identifies common data segments.

8. The method of claim 7 wherein each overhead stream represents a backup of a different device.

9. Apparatus for creating backup files having less redundancy comprising:
    a backup server for accessing at least one file to be backed up, creating data segments and an overhead stream each time a backup is triggered, determining when a data segment is redundant; and when a data segment is redundant, deleting the data segment from memory and updating the overhead stream to identify a previously stored data segment that is identical to the deleted data segment.

10. The apparatus of claim 9 further comprising at least one server containing at least one file to be backed up.

11. The apparatus of claim 9 wherein a separate overhead stream is created for each at least one server.

12. A computer readable medium for storing software that, when executed on a processor, causes the processor to perform a method comprising:
    for each file to be backed up, creating a data segment;
    storing the data segment at a location in memory;
    creating an overhead stream having a pointer that identifies the location of the data segment;
    determining if the data segment is redundant to a previously stored data segment;
    if the data segment is redundant, deleting the redundant data segment; and
    updating the overhead stream pointer to identify the previously stored data segment that is identical to the deleted data segment.

13. The method of claim 12 wherein the determining step comprises:
    computing a checksum that represents the contents of the data segment;

comparing the checksum to at least one previously generated checksums; and if a matching checksum is found, identifying the data segment as redundant.

14. The method of claim 13 wherein the checksum is an MD5 checksum.

15. The method of claim 13 wherein the checksum is used to define a directory path and file name for the data segment.

16. The method of claim 15 further comprising, for each redundant data segment, performing a binary compare between the data segment and the previously stored data segment.

17. The method of claim 16 wherein the checksum is a unique signature or fingerprint representing the contents of the data segment.

* * * * *